(12) United States Patent
Ishikiriyama (10) Patent No.: US 10,843,813 B2
(45) Date of Patent: Nov. 24, 2020

(54) LAMP UNIT

(71) Applicant: Koito Manufacturing Co., Ltd., Tokyo (JP)

(72) Inventor: Masaru Ishikiriyama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/519,174

(22) Filed: Jul. 23, 2019

(65) Prior Publication Data

US 2020/0039661 A1    Feb. 6, 2020

(30) Foreign Application Priority Data

Aug. 1, 2018   (JP) ................................. 2018-145414

(51) Int. Cl.
| | |
|---|---|
| *B64D 45/02* | (2006.01) |
| *F21S 41/19* | (2018.01) |
| *F21S 41/29* | (2018.01) |
| *F21V 25/10* | (2006.01) |
| *F21V 23/00* | (2015.01) |
| *F21V 23/06* | (2006.01) |
| *F21V 19/00* | (2006.01) |

(Continued)

(52) U.S. Cl.
CPC ............ *B64D 45/02* (2013.01); *F21S 41/192* (2018.01); *F21S 41/29* (2018.01); *F21V 19/0055* (2013.01); *F21V 23/002* (2013.01); *F21V 23/06* (2013.01); *F21V 25/10* (2013.01); *B64D 2203/00* (2013.01); *F21W 2107/30* (2018.01); *F21Y 2115/10* (2016.08)

(58) Field of Classification Search
CPC ......................... B64D 45/02; B64D 2203/10; B64D 2203/00; B64D 47/02; F21S 41/192; F21S 41/29; F21V 19/0055; F21V 23/002; F21V 23/06; F21V 25/10; F21V 5/04; F21Y 2115/10; F21W 2107/30; H02G 13/00; H02G 13/80
See application file for complete search history.

(56) References Cited

U.S. PATENT DOCUMENTS

| | | | |
|---|---|---|---|
| 7,663,506 B2 * | 2/2010 | Lundberg | ............... B64D 39/00 340/945 |
| 8,579,479 B2 * | 11/2013 | Kohlmeier-Beckmann | ................. B64D 47/06 362/470 |

(Continued)

FOREIGN PATENT DOCUMENTS

JP    2005-026001 A    1/2005

*Primary Examiner* — Peggy A Neils
(74) *Attorney, Agent, or Firm* — Abelman, Frayne & Schwab (57) ABSTRACT

A lamp unit is attached to an exterior panel of an aircraft and configured by accommodating a light source into a lamp chamber formed by a metallic housing and a cover attached to the housing. The cover includes a cover body having a light transmissive region that transmits light emitted from the light source and a metallic body support that supports an outer peripheral portion of the cover body. A holding cable that electrically and mechanically connects the housing and the body support is arranged in the lamp chamber. A grounding terminal that electrically connects the holding cable to a fuselage side structural member of the aircraft is provided in the housing.

12 Claims, 7 Drawing Sheets

(51) Int. Cl.
*F21Y 115/10* (2016.01)
*F21W 107/30* (2018.01)

(56) References Cited

U.S. PATENT DOCUMENTS

| | | | | |
|---|---|---|---|---|
| 8,699,203 B2* | 4/2014 | Le Louarn | ............. | B64D 45/02 |
| | | | | 361/117 |
| 8,746,611 B2* | 6/2014 | Therond | ................ | H02G 13/00 |
| | | | | 244/1 A |
| 9,776,735 B2* | 10/2017 | Williams | ............... | B64D 47/06 |
| 10,117,301 B2* | 10/2018 | Borlez | ................... | H05B 45/00 |
| 2012/0313547 A1* | 12/2012 | Barnett | ................... | F21V 31/00 |
| | | | | 315/297 |
| 2013/0249375 A1* | 9/2013 | Panagotacos | ........... | F21V 23/06 |
| | | | | 313/13 |
| 2017/0217604 A1* | 8/2017 | Birchak | ................ | B64D 13/04 |

* cited by examiner

LAMP UNIT

CROSS-REFERENCE TO RELATED APPLICATIONS

This application is based on and claims priority from Japanese Patent Application No. 2018-145414, filed on Aug. 1, 2018, with the Japan Patent Office, the disclosure of which is incorporated herein in its entirety by reference.

TECHNICAL FIELD

The present disclosure relates to a lamp unit attached to an exterior panel of an aircraft.

BACKGROUND

Various types of lamp units are attached to the exterior panel of an aircraft.

For example, an outer emergency light is arranged in the vicinity of a storage portion of an emergency exit slope to irradiate the lower region of the emergency exit slope which expands from a fuselage and is set between the fuselage and the ground in an emergency situation.

Japanese Patent Laid-Open Publication No. 2005-026001 discloses an embedded type marker lamp device installed on a roadbed in an airport, which includes a plurality of light emitting diodes as its light source.

The embedded type marker lamp device is provided with a surge absorbing circuit connected to a metallic lamp body in order to protect the light emitting diodes from the stress of the surge voltage caused by a lightning strike.

SUMMARY

A lamp unit attached to an exterior panel of an aircraft may be configured to have a structure for protecting lamp components from damage of lightning. At this time, it is required to implement the above configuration while preventing the lamp function from being impaired as much as possible.

The present disclosure has been made in consideration of the circumstances, and the present disclosure is to provide a lamp unit that is attached to an exterior panel of an aircraft, and is capable of protecting the lamp components from damage of lightning without impairing the lamp function.

The present disclosure is to achieve the above object by effectively utilizing lamp components.

That is, a lamp unit according to the present disclosure is a lamp unit attached to an exterior panel of an aircraft. The lamp unit includes a housing made of metal; a cover attached to the housing to form a lamp chamber; and a light source accommodated in the lamp chamber. The cover includes a cover body having a light transmissive region that transmits light emitted from the light source and a metallic body support that supports an outer peripheral portion of the cover body, and the cover is fixed to the housing at the body support. A holding cable that electrically and mechanically connects the housing and the body support is arranged in the lamp chamber at a position which does not block the light from the light source toward the light transmissive region of the cover body. A grounding terminal is provided in the housing to electrically connect the holding cable to a fuselage side structural member of the aircraft.

The specific use of the "lamp unit" according to the present disclosure is not particularly limited as long as the lamp unit is attached to an exterior of an aircraft.

The specific structure of the "holding cable" is not particularly limited as long as the holding cable has strength to the extent that the holding cable is not broken even if a tensile load due to the weight of the cover member acts on the holding cable in a state where the cover member is removed from the housing.

The specific configuration or arrangement of the "grounding terminal" is not particularly limited as long as the holding cable is capable of being electrically connected to the fuselage structural member of the aircraft.

The lamp unit according to the present disclosure is a lamp unit attached to the exterior panel of the aircraft, and since the lamp unit has a configuration in which the light source is accommodated in the lamp chamber formed of the metallic housing and the cover attached to the housing, the replacement of the light source may be performed by removing the cover.

Further, the cover includes a cover body having a light transmissive region that transmits light emitted from the light source and a metallic body support that supports an outer peripheral portion of the cover body, and is fixed to the housing at the body support. Thus, it is possible to implement a rigid configuration capable of withstanding pressure fluctuation after securing the optical function as a lamp unit.

In addition, the holding cable that electrically and mechanically connects the housing and the body support of the cover is arranged in the lamp chamber at a position which does not block the light from the light source toward the light transmissive region of the cover body, and further, the grounding terminal that electrically connects the holding cable to the fuselage side structural member of the aircraft is provided in the housing. Thus, the following effects may be obtained.

That is, even if lightning strikes the exterior panel in the vicinity of the housing, it is possible to release the electricity from the grounding terminal to the fuselage side structural member through the housing. Further, even if lightning strikes the body support of the cover body, it is possible to release the electricity from the grounding terminal to the fuselage side structural member through the holding cable and the housing.

At this time, since the holding cable is arranged at the position which does not block the light from the light source toward the light transmissive region of the cover body, it is possible to protect the lamp components from damage of lightning without impairing the lamp function.

Further, since the holding cable also mechanically connects the housing and the body support, it is possible to prevent in advance the occurrence of a situation where the cover member falls off carelessly when the cover member is removed to perform the replacement of the light source.

As described above, according to the present disclosure, in a lamp unit attached to an exterior panel of an aircraft, it is possible to protect lamp components from the damage of lightning without impairing the lamp function.

Further, in the above configuration, when the configuration of the holding cable is formed such that both ends thereof are arranged at positions opposing to each other with respect to the light source, it is possible to easily secure the length of the holding cable, and thus, the workability at the time of replacement of the light source may be improved.

Further, in the above configuration, when the light source is configured by at least one light emitting element mounted on a substrate, and then, a protruding portion is formed on the bottom wall of the housing to protrude toward the inside of the lamp chamber, the substrate is detachably attached to the protruding portion, and the holding cable is arranged to pass between the peripheral wall of the housing and the protruding portion, it is possible to easily secure the installation space of the holding cable, and to prevent the holding cable from largely vibrating in the lamp chamber.

Further, in the above configuration, when the housing is formed such that an outer peripheral flange portion is formed on the outer peripheral side of the portion that fixes the body support of the cover, and then, the lamp unit is configured to be attached to the exterior panel from the inside of the aircraft at the outer peripheral flange portion, it is possible to make the attached portion of the lamp with respect to the exterior panel invisible from the outside of the aircraft, and thus, the improvement of the appearance of the lamp attaching portion may be achieved.

Further, in the above configuration, when the lamp unit is configured to be attached to the exterior panel at a side surface portion of the aircraft, and then, a notch is formed at a lower end portion of the body support of the cover member to discharge water pooled in the lamp chamber to an outer space (that is, a space outside the aircraft) of the exterior panel, and the holding cable is arranged to pass above the light source, the following effects may be obtained.

That is, since the lamp unit attached to the exterior panel of the aircraft is placed under an environment where the pressure or the temperature is fluctuated rapidly, water is easily pooled in the lamp chamber, and as a result, the lamp function tends to be impaired.

However, by forming the notch at the body support of the cover to discharge the water pooled in the lamp chamber to the outer space of the exterior panel, it is possible to easily maintain the lamp function.

At this time, since the holding cable is arranged to pass above the light source, it is possible to prevent in advance the water pooled in the lamp chamber from being difficult to be led to the notch due to the presence of the holding cable.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an embodiment of the present disclosure will be described with reference to drawings.

Figure 1:
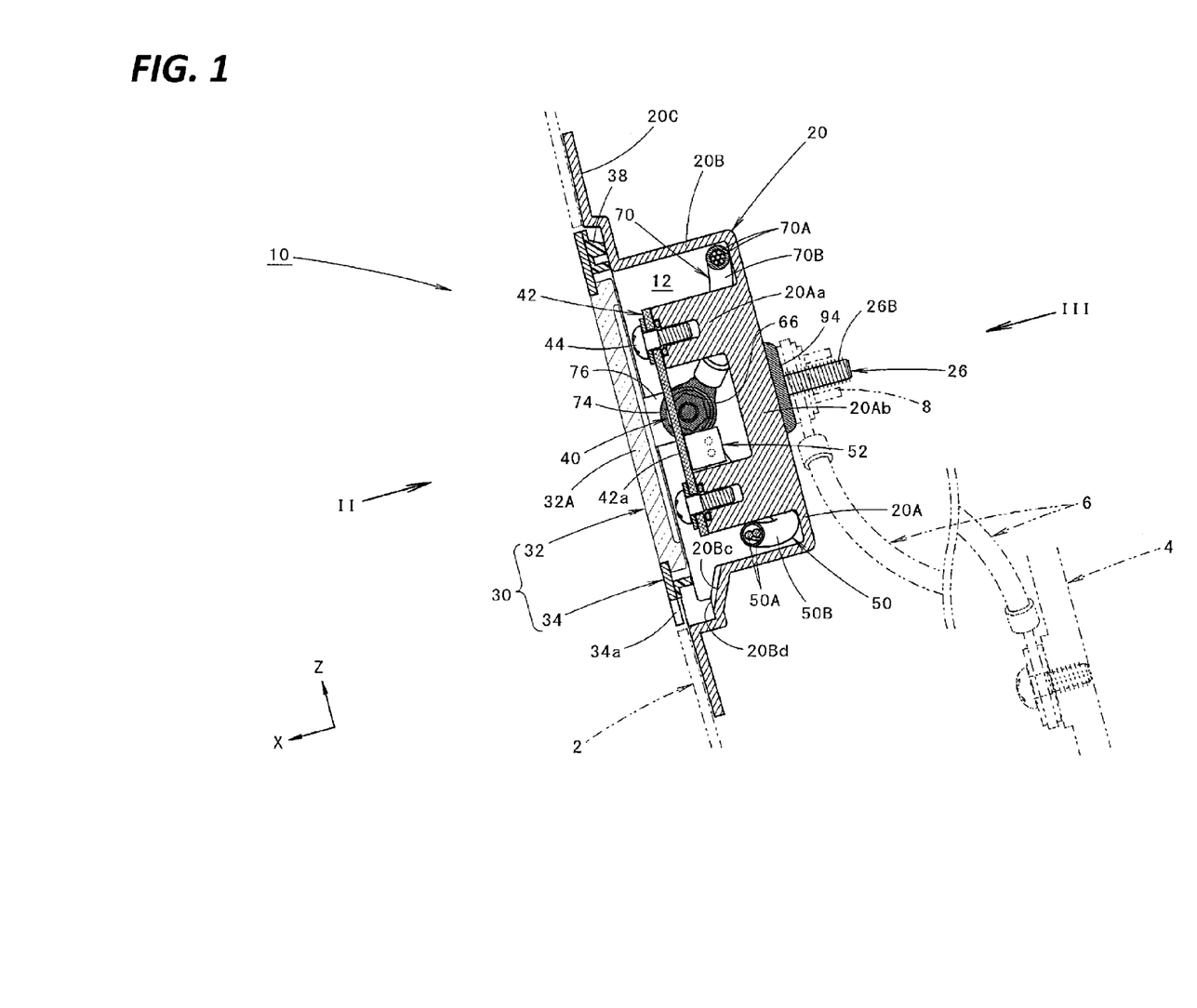
FIG. 1 is a side cross-sectional view illustrating a lamp unit according to an embodiment of the present disclosure.
Figure 2:
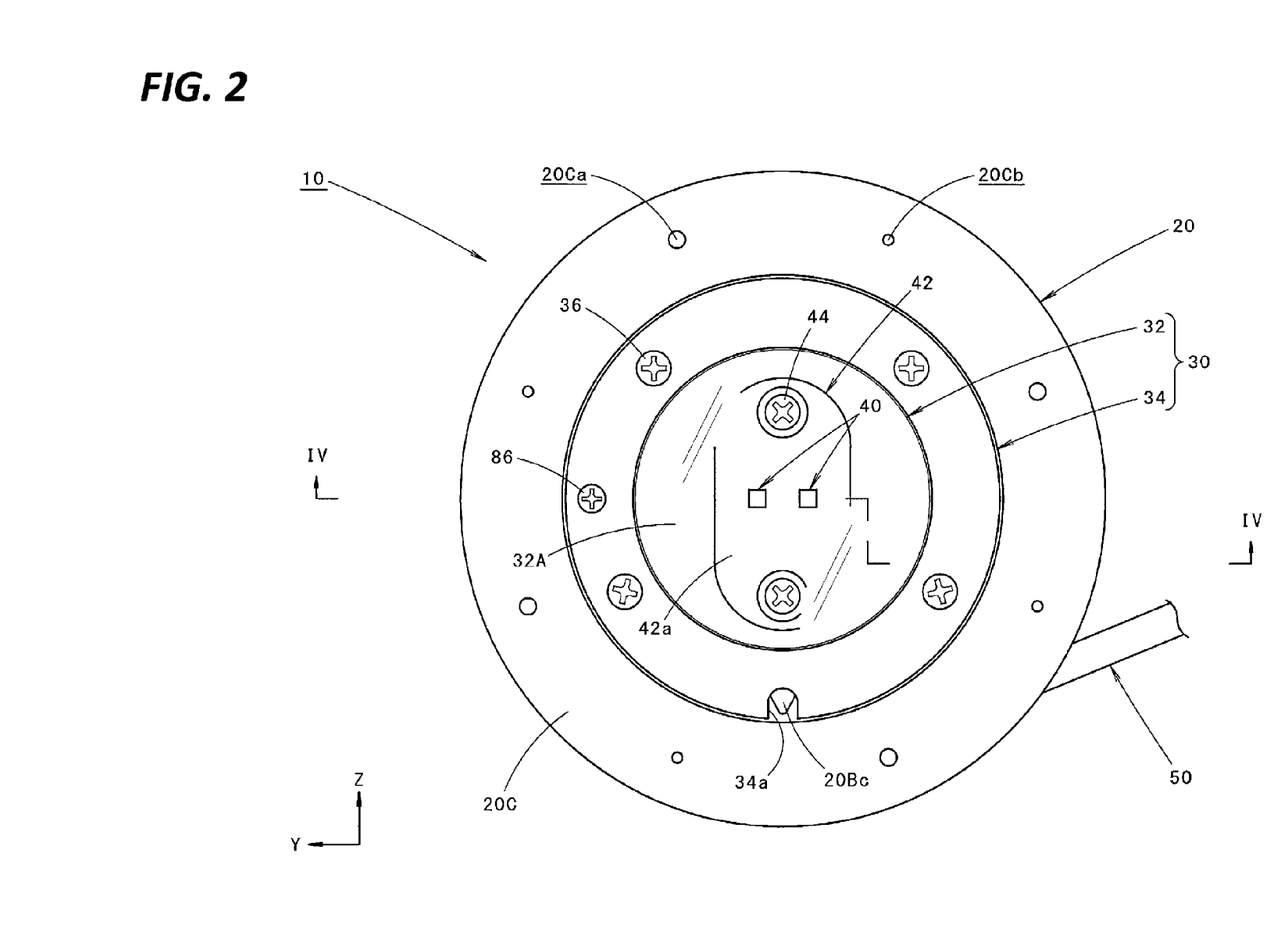
FIG. 2 is a front view illustrating the lamp unit as a view viewed in a direction of arrow II in FIG. 1.
Figure 3:
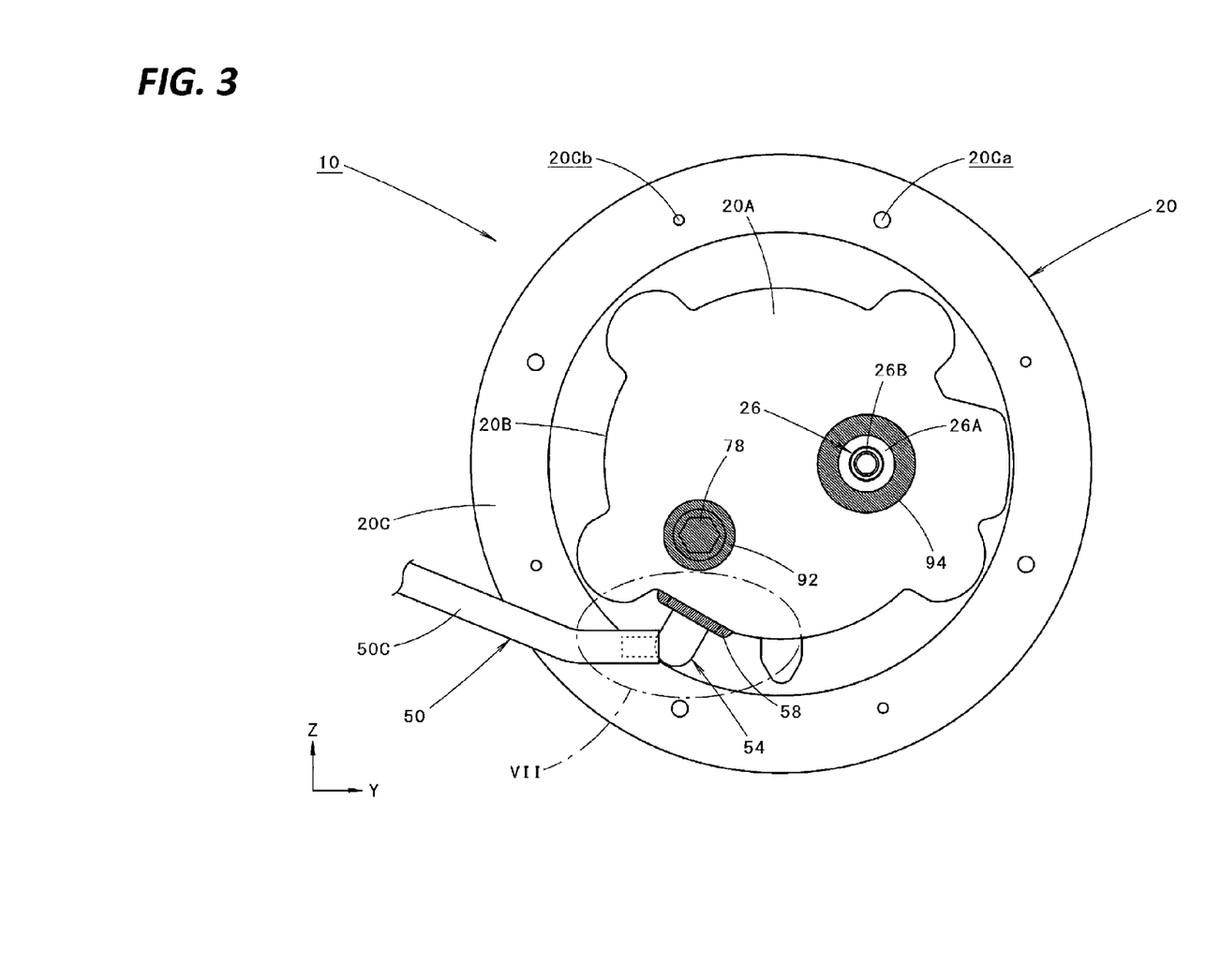
FIG. 3 is a rear view illustrating the lamp unit as a view viewed in a direction of arrow III in FIG. 1.
Figure 4:
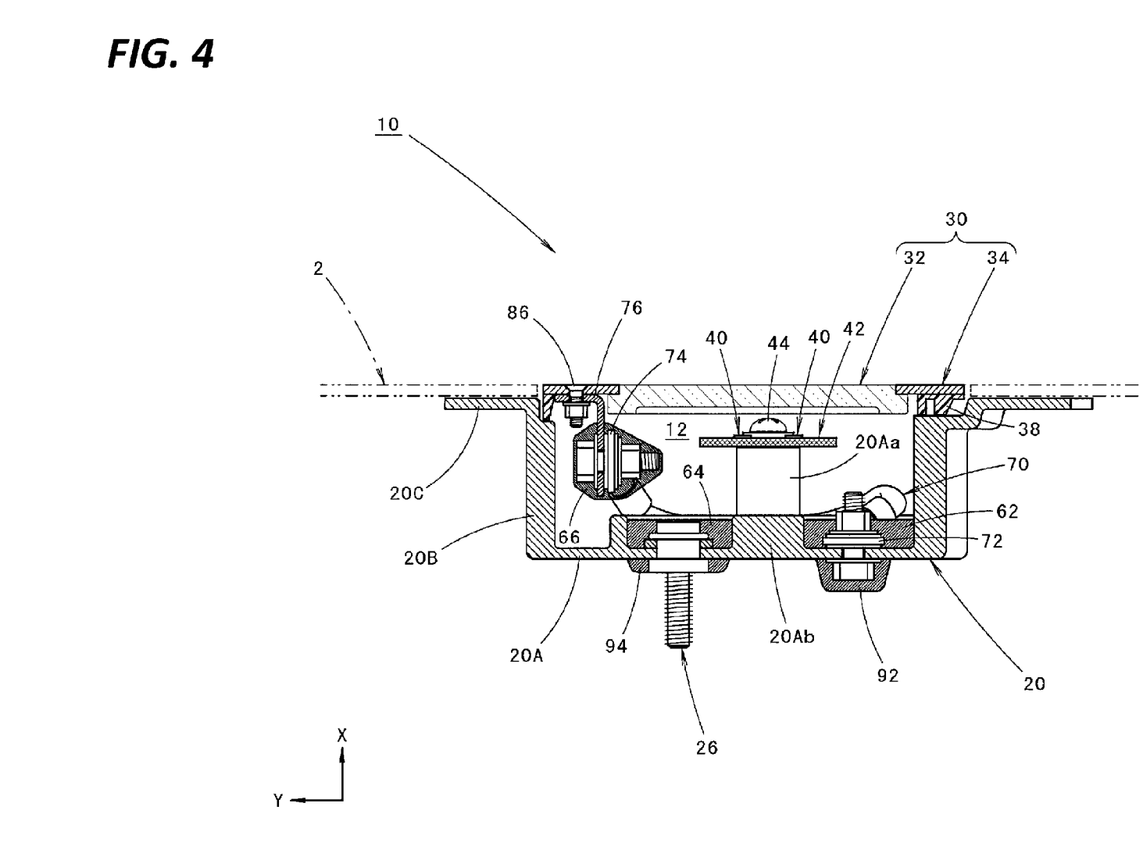
FIG. 4 is a cross-sectional view taken along line IV-IV of FIG. 2.

FIG. 1 is a side cross-sectional view illustrating a lamp unit 10 according to the embodiment of the present disclosure. FIG. 2 is a front view illustrating the lamp unit 10 as a view viewed in a direction of arrow II in FIG. 1, and FIG. 3 is a rear view illustrating the lamp unit 10 as a view viewed in a direction of arrow III in FIG. 1. FIG. 4 is a cross-sectional view taken along line IV-IV of FIG. 2.

As illustrated in the drawings, the lamp unit 10 according to the embodiment serves as an outer emergency light attached to an exterior panel 2 of a left side surface portion of an aircraft, and is configured as a lamp unit to irradiate a lower region of an emergency exit slope which expands from a fuselage and is set between the fuselage and the ground in an emergency.

In the drawings, a direction indicated by X is the "front" of the lamp unit ("left oblique downward" of the aircraft), a direction indicated by Y is the "left" of the lamp unit ("front" of the aircraft), and a direction indicated by Z is "upward" of the lamp unit ("oblique upward" of the aircraft). There are applied to other drawings.

The lamp unit 10 according to the embodiment is configured such that two light emitting elements 40 are accommodated as light sources in a substantially cylindrical lamp chamber 12 formed of a metallic (specifically, made of aluminum) housing 20 and a cover member 30 attached to the housing 20.

The housing 20 includes a bottom wall portion 20A positioned on the lamp rear side of the lamp chamber 12, a peripheral wall portion 20B that extends from the outer peripheral edge of the bottom wall portion 20A, and an outer peripheral flange portion 20C that annularly extends from the end portion of the lamp front side of the peripheral wall portion 20B toward the outer peripheral direction.

Then, as illustrated in FIG. 1, the lamp unit 10 according to the embodiment is configured to be attached to a metallic exterior panel 2 from the inside of the aircraft at the outer peripheral flange portion 20C of the housing 20.

In order to implement the above, as illustrated in FIG. 2, a plurality of large and small through holes 20Ca and 20Cb are formed in the circumferential direction on the outer peripheral flange portion 20C of the housing 20. Then, the attaching of the lamp unit 10 to the exterior panel 2 is performed by riveting the housing 20 to the exterior panel 2 at each of the through holes 20Ca and 20Cb.

The cover member 30 includes a glass cover body 32 having a light transmissive region 32A that transmits light emitted from the two light emitting elements 40 and a metallic (specifically, aluminum) body support 34 that supports an outer peripheral portion of the cover body 32. The cover member 30 is configured to be fixed to the housing 20 by fastening a metallic (specifically, stainless steel) screw 36 to the housing 20 at four locations on the circumferential direction of the body support 34.

The body support 34 of the cover member 30 is configured as an annular plate-shaped member, and a gasket 38 made of a silicone resin is adhered to a surface of the body support 34 inside the aircraft. Then, when the cover member 30 is fixed to the housing 20, the gasket 38 abuts on the housing 20 and is elastically deformed to some extent, and thus, the surface of cover member 30 outside the aircraft and the surface of the exterior panel 2 outside the aircraft may be arranged on the same plane.

Figure 5:
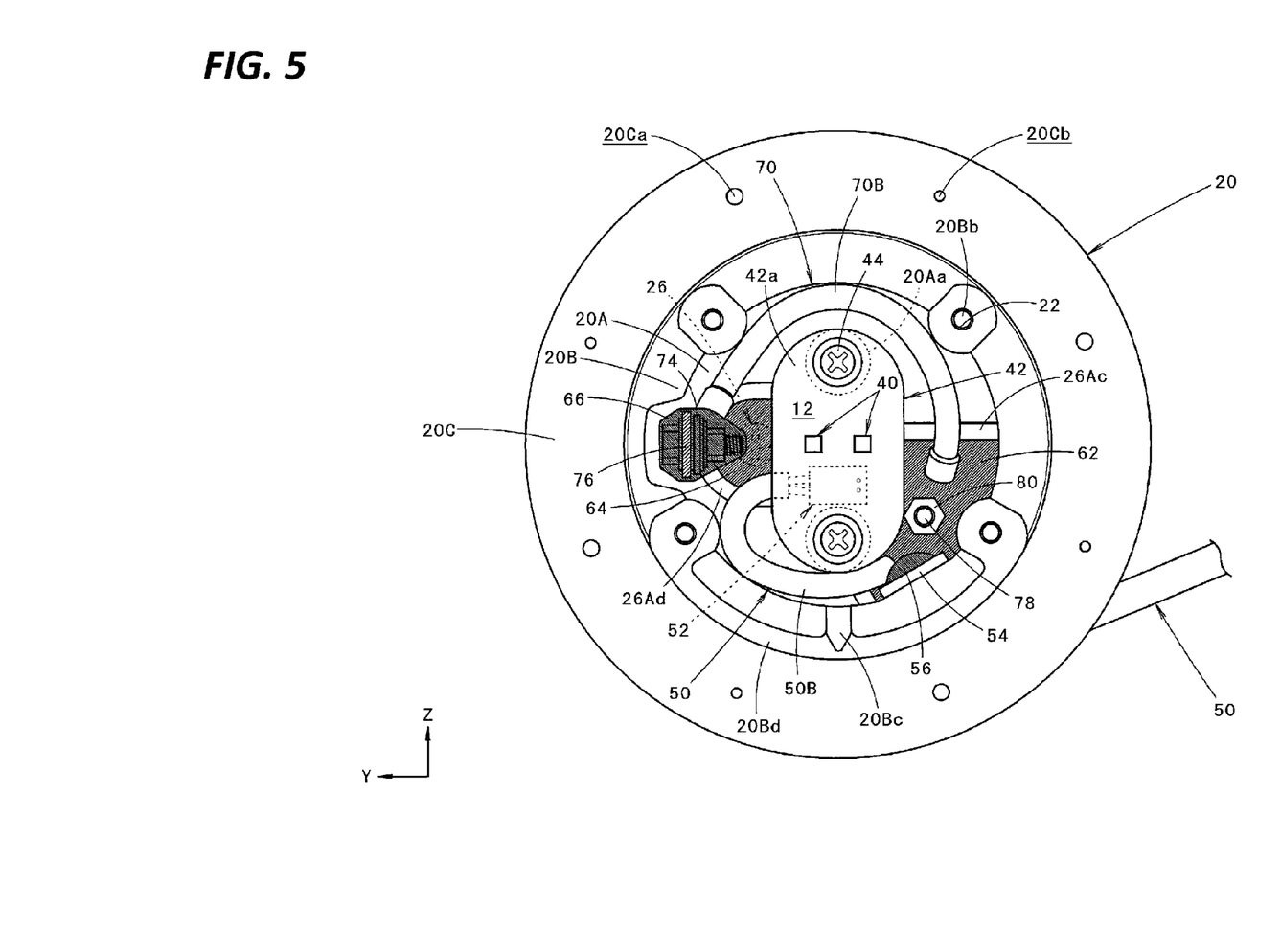
FIG. 5 is a front view illustrating the lamp unit in a state where a cover member is removed from a housing thereof.

FIG. 5 is a front view illustrating the lamp unit 10 in a state where the cover member 30 is removed from the housing 20 thereof.

As illustrated in FIG. 5, a screw hole 20Bb for fastening the screw 36 (see FIG. 2) is formed at the four locations on the circumferential direction, on a front end surface of the peripheral surface portion 20B of the housing 20.

A screw-tightening type insert 22 is attached to each screw hole 20Bb, and the fastening of the screw 36 to the insert 22 is performed. As described above, the configuration in which the insert 22 is attached to each screw hole 20*bb* prevents in advance the screw 36 in a fastened state from being loosened.

In the embodiment, an insert having a stainless steel surface plated with cadmium is used as the insert 22, and thus, occurrence of electrolytic corrosion between the screw 36 and the housing 20 is prevented.

A pair of upper and lower protruding portions 20Aa are formed on the bottom wall portion 20A of the housing 20 to cylindrically protrude toward the front of the lamp (that is, toward inside the lamp chamber 12). Then, a substrate 42 having an outer shape of an elongated long oval is attached on a tip end surface of the pair of upper and lower protruding portions 20Aa. The attachment of the substrate 42 is detachably performed by fastening a screw 44 to each of the protruding portions 20Aa to which the substrate 42 is placed.

Both of the two light emitting elements 40 are white color light emitting diodes having a rectangular light emitting surface, and are mounted on a front surface 42*a* of the substrate 42. At this time, the two light emitting elements 40 are arranged side by side at the substantially central portion in the vertical direction of the substrate 42.

Waterproof treatment is performed on the front surface 42*a* of the substrate 42. The waterproof treatment is performed over the entire region of the front surface 42*a* of the substrate 42 by applying, for example, acrylic resin.

The substrate 42 is electrically connected to a power supply cable 50 that supplies power to the two light emitting elements 40. The power supply cable 50 has a configuration in which two power supply cords 50A (see FIG. 1) are accommodated in a resin tube 50B.

The electrical connection between the power supply cable 50 and the two light emitting elements 40 is implemented by connecting a connector 52 fitted to the end portions of the two power supply cords 50A to a power receiving terminal (not illustrated) arranged on a back surface of the substrate 42. The power supply cable 50 is arranged to extend from the lamp chamber 12 to the outside of the lamp chamber 12, and the specific configuration will be described later.

A holding cable 70 that electrically and mechanically connects the housing 20 and the body support 34 of the cover member 30 is arranged in the lamp chamber 12 at a position which does not block light from the light emitting elements 40 toward the light transmissive region 32A of the cover body 32.

The holding cable 70 has a configuration in which a metallic stranded wire 70A (see FIG. 1) is accommodated in a resin tube 70B, and both ends of the stranded wire 70A are connected to round terminals 72 and 74, respectively, as illustrated in FIG. 4.

As illustrated in FIG. 5, the holding cable 70 is arranged to pass above the two light emitting elements 40. Specifically, the holding cable 70 is arranged to pass through between the peripheral wall portion 20B of the housing 20 and the protruding portion 20Aa positioned on the upper side.

Then, as illustrated in FIG. 4, the holding cable 70 is electrically connected to the bottom wall portion 20A of the housing 20 at the round terminal 72 to which the end portion positioned on the right side of the two light emitting elements 40 is connected, and further, is electrically connected to the body support 34 of the cover member 30 via an L-shaped metal fitting 76 made of aluminum at the round terminal 74 to which the end portion positioned on the left side of the two light emitting elements 40 is connected.

Figure 6:
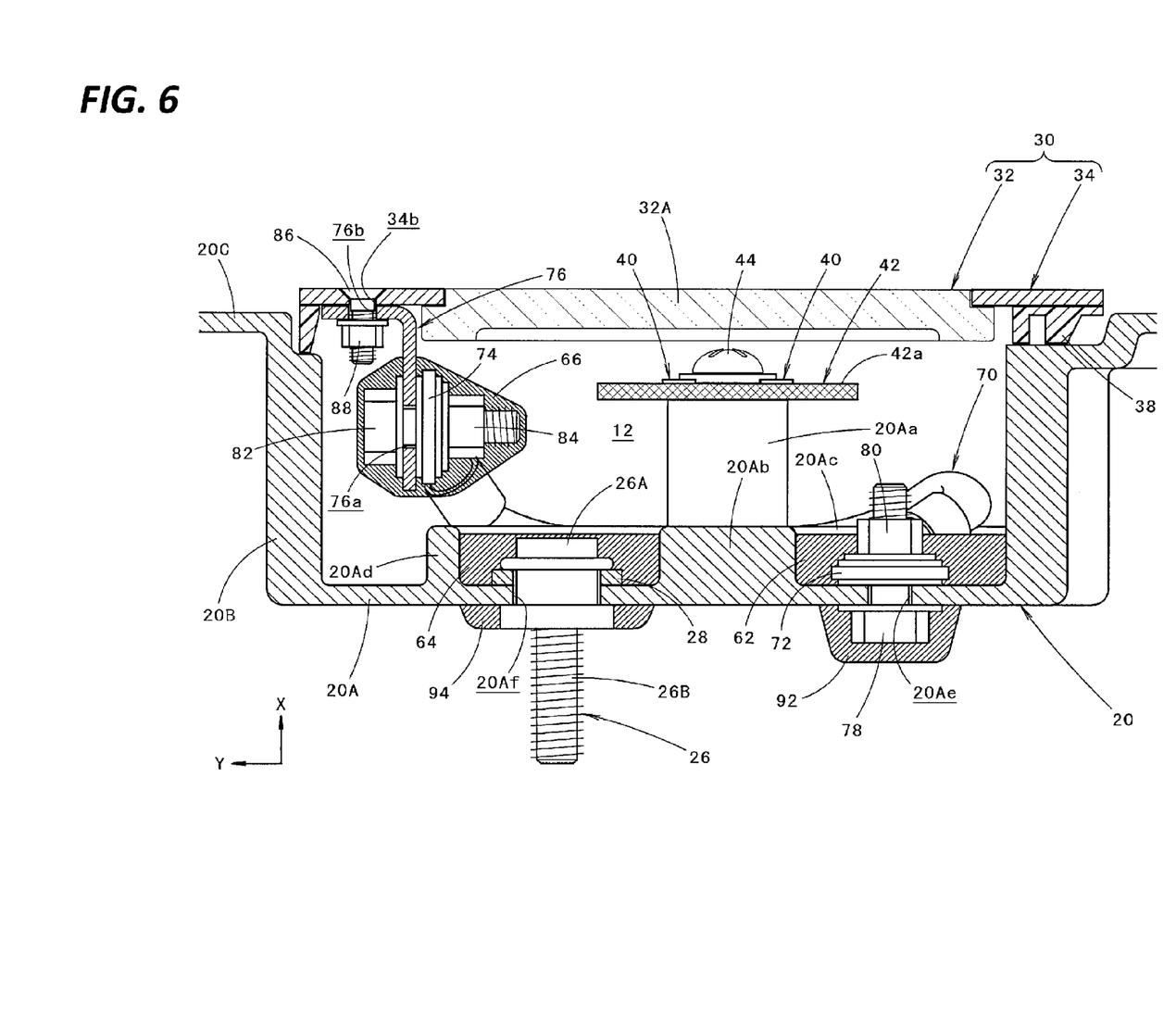
FIG. 6 is a detailed view illustrating a main portion in FIG. 4.

FIG. 6 is a detailed view illustrating a main portion in FIG. 4.

As illustrated in FIG. 6, the round terminal 72 is fixed to the bottom wall portion 20A of the housing 20 by a bolt 78 and a nut 80. The fixation of the round terminal 72 is performed by inserting the bolt 78 into the lamp chamber 12 from rear side of the lamp through a bolt inserting through hole 20Ae formed on the bottom wall portion 20A, and fastening the nut 80 to the bolt 78 in a state where the round terminal 72 is attached to the bolt 78. The fixation is performed below the central position in the vertical direction in the lamp chamber 12 (see FIG. 5). At this time, a bolt made of a titanium alloy is used as the bolt 78, and a nut having a stainless steel surface plated with cadmium is used as the nut 80.

Meanwhile, the round terminal 74 is fixed to the L-shaped metal fitting 76 fixed to the body support 34 of the cover member 30, by a bolt 82 and a nut 84. The fixation of the round terminal 74 is performed by inserting the bolt 82 into a bolt inserting through hole 76*a* formed at the L-shaped metal fitting 76, and fastening the nut 84 to the bolt 82 in a state where the round terminal 74 is attached to the bolt 82. The material of the bolt 82 and the nut 84 is the same as that of the bolt 78 and the nut 80.

The fixation of the L-shaped metal fitting 76 to the body support 34 of the cover member 30 is performed, in a state where a countersunk screw 86 is inserted from the front side of the lamp into a screw inserting through hole 34*b* formed at the body support 34 and a screw inserting through hole 76*b* formed at the L-shaped metal fitting 76, by fastening a nut 88 to the countersunk screw 86. The fixation is performed above the central position in the vertical direction in the lamp chamber 12. At this time, a countersunk screw and a nut having a stainless steel surface plated with cadmium are used as the countersunk screw 86 and the nut 88.

As illustrated in FIG. 1, a bolt 26 protruded toward the rear of the lamp (that is, toward the outside of the lamp chamber 12) is provided as a grounding terminal that electrically connects the holding cable 70 to a fuselage side structural member 4 of the aircraft, on the bottom wall portion 20B of the housing 20. The bolt 26 is configured to function as a grounding terminal for the housing 20 and the body support 34 of the cover member 30.

As illustrated in FIG. 6, a head portion 26A of the bolt 26 is made of an aluminum member, and a shaft portion 26B thereof on which threads are formed is made of an alloy steel member. Then, the bolt 26 is fixed by caulking to the bottom wall portion 20A of the housing 20 at its head portion 26A.

The fixation of the bolt 26 by caulking is performed by inserting the head portion 26A of the bolt 26 into the lamp chamber 12 from rear side of the lamp through a bolt inserting through hole 20Af formed on the bottom wall portion 20A, and crushing the head portion 26A from the front side of the lamp in a state where an annular spacer 28 is attached to the head portion 26A. The fixation by caulking is performed at the central position in the vertical direction on the left side from the pair of upper and lower protruding portions 20Aa in the lamp chamber 12 (see FIG. 5).

As illustrated in FIG. 1, an end portion of a grounding cable 6 that extends from the fuselage side structural member 4 is fixed to the shaft portion 26B of the bolt 26 by screwing and fastening with a nut 8.

A portion positioned between the pair of upper and lower protruding portions 20Aa is formed as a thick portion 20Ab at the bottom wall portion 20A of the housing 20. Further, as illustrated in FIGS. 5 and 6, in the bottom wall portion 20A of the housing 20, an upright wall portion 20Ac that surrounds the bolt 78 and the nut 80 fixing the round terminal 72 is formed on the right side of the thick portion 20Ab, and an upright wall portion 20Ad that surrounds the head portion 26A of the bolt 26 is formed on the left side of the thick portion 20Ab.

The thick portion 20Ab and the upright wall portions 20Ac and 20Ad are formed to be on the same plane at a position where their tip end surfaces are higher than the tip end surface of the head portion 26A of the bolt 26 (that is, the position on the front side of the lamp).

Then, a resin material 62 is filled so as to cover the mediate portion of the nut 80 in a concave space surrounded by the bottom wall portion 20A, the thick portion 20Ab, the upright wall portion 20Ac, and the peripheral wall portion 20B of the housing 20, and further, a resin material 64 is filled so as to cover the head portion 26A of the bolt 26 in a concave space surrounded by the bottom wall portion 20A, the thick portion 20Ab, the upright wall portion 20Ad of the housing 20. A silicone resin is used as the resin materials 62 and 64. At this time, when a silicone resin having a low viscosity is used, the resin materials 62 and 64 may be filled using, for example, a syringe, so that it is possible to improve the filling workability.

Meanwhile, on an outer surface of the bottom wall portion 20A of the housing 20, a sealing agent 92 that seals a gap between the bolt 78 fixing the round terminal 72 and the bottom wall portion 20A is applied so as to cover the head portion of the bolt 78, and further, a sealing agent 94 that seals a gap between the bolt 26 as the grounding terminal and the bottom wall portion 20A is applied so as to surround a part of the bolt 26. At this time, a silicone resin is used as the sealing agent 92, and a sulfone resin is used as the sealing agent 94.

A resin material 66 that covers the round terminal 74, the bolt 82, the nut 84, and a part of L-shaped metal fitting 76 is applied on the connecting portion between the bolt 82 and the nut 84 fixing the round terminal 74, and the L-shaped metal fitting 76. At this time, a sulfone resin is used as the resin material 66.

The surface of the housing 20 is coated substantially over the entire region, but the portion of the screw through holes 20Bb formed at the four locations at the peripheral wall portion 20B and the portion around the bolt inserting through holes 20Ae and 20Af at the inner surface of the bottom wall portion 20A are not coated to ensure conductivity. Further, the surface of the body support 34 of the cover member 30 is also coated substantially over the entire region, but the portion around the screw inserting through hole 34b at the back surface of the body support 34 is not coated to ensure conductivity. The surface of the L-shaped metal fitting 76 is also coated substantially over the entire region, but the portion around the screw inserting through hole 76b at the front surface of the L-shaped metal fitting 76 is not coated to ensure conductivity.

As illustrated in FIGS. 1 and 2, a notch 34a is formed at the lower end portion of the body support 34 of the cover member 30 to discharge water pooled in the lamp chamber 12 to an outer space (that is, a space outside the aircraft) of the exterior panel 2. Further, a concave portion 20Bc is formed at the lower end portion of the inner peripheral surface of the peripheral wall portion 20B of the housing 20 to lead the water pooled in the lamp chamber 12 to the notch 34a of the cover member 30. As illustrated in FIG. 5, a drainage groove 20Bd that leads the water pooled in the lamp chamber 12 to the concave portion 20Bc is formed at both left and right sides of the concave portion 20Bc to extend along the inner peripheral surface of the peripheral wall portion 20B.

Figure 7:
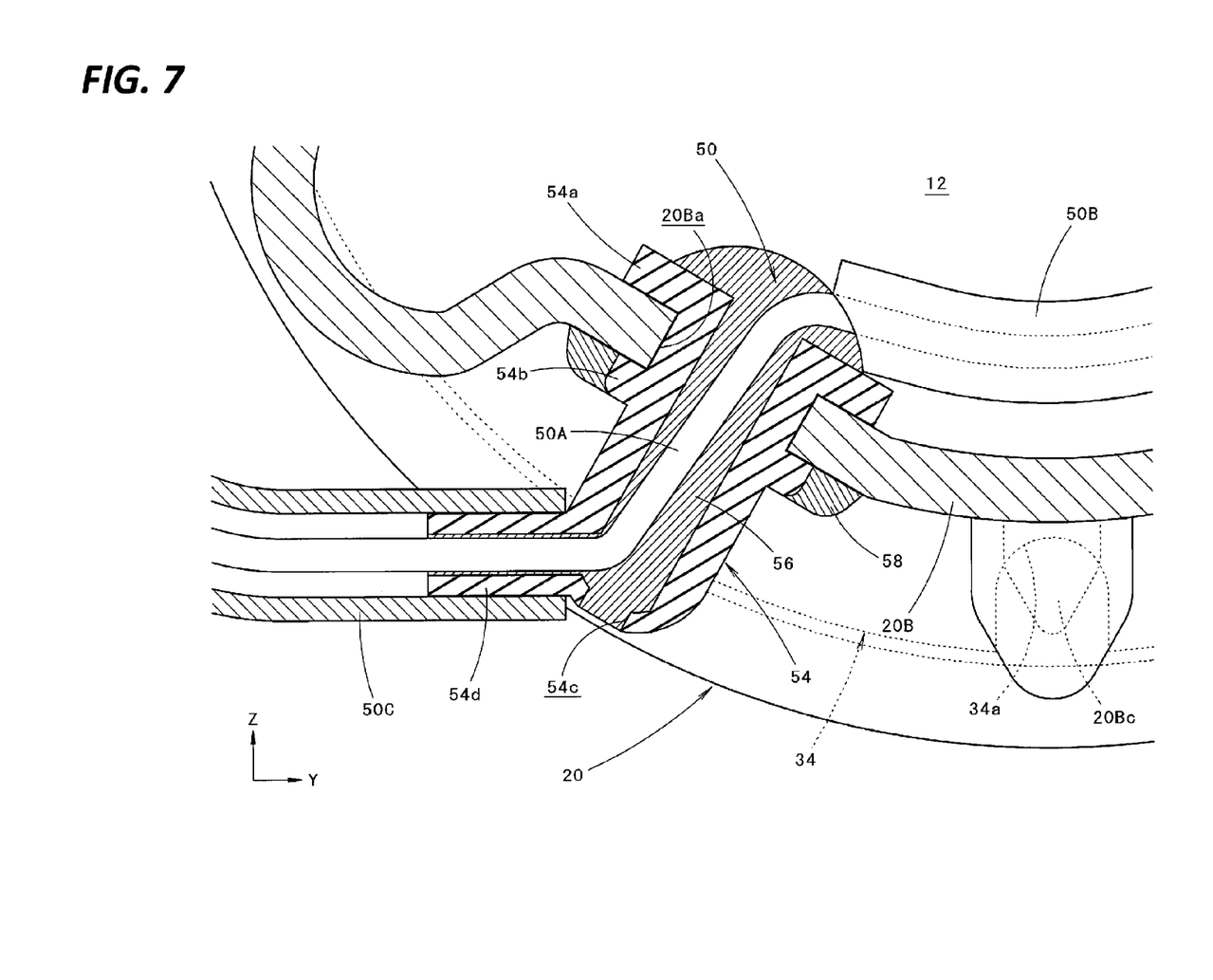
FIG. 7 is a detailed cross-sectional view illustrating a main portion in FIG. 3.

FIG. 7 is a detailed cross-sectional view illustrating a main portion in FIG. 3.

As described above, the power supply cable 50 is arranged to extend from the inside of the lamp chamber 12 to the outside of the lamp chamber 12. However, as illustrated in FIG. 7, in the lamp chamber 12, the power supply cable 50 has a configuration in which the two power supply cords 50A are accommodated in the tube 50B, and, at the outside of the lamp chamber 12, has a configuration in which the two power supply cords 50A are accommodated in a resin tube 50C.

Each power supply cord 50A has a configuration in which a metallic core wire is covered with a resin (specifically, a tetrafluoroethylene resin) coating film.

An inserting through hole 20Ba is formed at the peripheral wall portion 20B of the housing 20 to insert the two power supply cords 50A of the power supply cable 50, and a resin bushing 54 having elasticity is attached to the inserting through hole 20Ba.

The bushing 54 is formed to extend cylindrically from a mounting position to the inserting through hole 20Ba toward outside the lamp chamber 12, and an inner flange portion 54a that annularly covers the inserting through hole 20Ba from the inside of the lamp chamber 12 and an outer flange portion 54b that annularly covers the inserting through hole 20Ba from the outside of the lamp chamber 12 are formed at the base end portion of the bushing 54. Further, an opening portion 54c is formed at the tip end portion of the bushing 54, and a cord support 54d that extends in an oblique direction while covering the two power supply cords 50A is formed in the vicinity of the opening portion 54c. Then, the end portion of the tube 50C is attached to the cord support 54c.

A resin material 56 is filled between the bushing 54 and the two power supply cords 50A arranged in a state of inserting the bushing 54. The resin material 56 is filled into the inner space from the opening portion 54c formed at the tip end portion of the bushing 54, and is filled to an extent that a portion thereof comes out into the lamp chamber 12. At this time, a sulfone resin that is excellent in adhesion to the coating film of the power supply cord 50A is used as the resin material 56.

Further, a sealing agent 58 that seals a gap between the bushing 54 and the peripheral wall portion 20B is applied outside the lamp chamber 12 to surround the outer flange portion 54b of the bushing 54. At this time, a silicone resin is used as the sealing agent 58.

Next, the operational effects of the embodiment will be described.

The lamp unit 10 according to the embodiment is a lamp unit attached to the exterior panel 2 of the aircraft, and the lamp unit 10 is configured to accommodate the two light emitting elements 40 (light source) in the lamp chamber 12 formed of the metallic housing 20 and the cover member 30 attached thereto, and thus, the replacement of the light source may be performed by removing the cover member 30.

Further, the cover member 30 includes the cover body 32 having the light transmissive region 32A that transmits light emitted from the two light emitting elements 40 and the metallic body support 34 that supports the outer peripheral portion thereof, and is fixed to the housing 20 at the body support 34, and thus, it is possible to implement a rigid configuration that may withstand pressure fluctuation or the like, after securing the optical function as the lamp unit 10.

In addition, the holding cable 70 that electrically and mechanically connects the housing 20 and the body support 34 of the cover member 30 is arranged in the lamp chamber 12 at a position which does not block light from the two light emitting elements 40 toward the light transmissive region 32A of the cover body 32, and further, the bolt 26 serving as the grounding terminal that electrically connects the holding cable 70 to the fuselage side structural member 4 of the aircraft is provided in the housing 20, and thus, the following effects may be obtained.

That is, even if lightning strikes the exterior panel 2 in the vicinity of the housing 20, it is possible to release the electricity from the bolt 26 to the fuselage side structural member 4 through the housing 20. Further, even if lightning strikes the body support 34 of the cover body 32, it is possible to release the electricity from the bolt 26 to the fuselage side structural member 4 through the holding cable 70 and the housing 20.

At this time, since the holding cable 70 is arranged at the position which does not block the light from the two light emitting elements 40 toward the light transmissive region 32A of the cover body 32, it is possible to protect the lamp components from damage of lightning without impairing the lamp function.

Further, since the holding cable 70 also mechanically connects the housing 20 and the body support 34, it is possible to prevent in advance the occurrence of a situation where the cover member 30 falls off carelessly when the cover member 30 is removed to perform the replacement of the light source.

As described above, according to the embodiment, in the lamp unit 10 attached to the exterior panel 2 of an aircraft, it is possible to protect lamp components from the damage of lightning without impairing the lamp function.

In the embodiment, since the holding cable 70 is formed such that both ends thereof are arranged at positions opposing to each other with respect to the two light emitting elements 40, it is possible to easily secure the length of the holding cable 70, and thus, the workability at the time of replacement of the light source may be improved.

Further, in the embodiment, since the protruding portion 20Aa that protrudes toward the inside of the lamp chamber 12 is formed on the bottom wall portion 20A of the housing 20, and the substrate 42 to which the two light emitting elements 40 are mounted is detachably attached to the protruding portion 20Aa, and the holding cable 70 is arranged to pass between the peripheral wall portion 20B of the housing 20 and the protruding portion 20Aa, it is possible to easily secure the installation space of the holding cable 70, and to prevent the holding cable 70 from largely vibrating in the lamp chamber 12.

Further, in the embodiment, since the configuration of the housing 20 is formed such that the outer peripheral flange portion 20C is formed on the outer peripheral side of the portion that fixes the body support 34 of the cover member 30, and the lamp unit 10 is configured to be attached to the exterior panel 2 from the inside of the aircraft at the outer peripheral flange portion 20C, it is possible to make the attached portion of the lamp unit 10 with respect to the exterior panel 2 invisible from the outside of the aircraft, and thus, the improvement of the appearance of the lamp unit attaching portion may be achieved.

Further, although the lamp unit 10 according to the embodiment is configured to be attached to the exterior panel 2 at the side surface portion of the aircraft, since the notch 34a is formed at the lower end portion of the body support 34 of the cover member 30 to discharge water pooled in the lamp chamber 12 to the outer space (that is, a space outside the aircraft) of the exterior panel 2, and the holding cable 70 is arranged to pass above the two light emitting elements 40, the following effects may be obtained.

That is, since the lamp unit 10 attached to the exterior panel 2 of the aircraft is placed under an environment where the pressure or the temperature is fluctuated rapidly, water is easily pooled in the lamp chamber 12, and as a result, the lamp function tends to be impaired. However, since the notch 34a is formed at the body support 34 of the cover member 30 to discharge the water pooled in the lamp chamber 12 to the outer space of the exterior panel 2, it is possible to easily maintain the lamp function.

At this time, since the holding cable 70 is arranged to pass above the two light emitting elements 40, it is possible to prevent in advance the water pooled in the lamp chamber 12 from being difficult to be led to the notch 34a due to the presence of the holding cable 70.

Further, in the embodiment, since the concave portion 20Bc is formed at the lower end portion of the inner peripheral surface of the peripheral wall portion 20B of the housing 20 to lead the water pooled in the lamp chamber 12 to the notch 34a of the cover member 30, and the drainage groove 20Bd that extends along the inner peripheral surface of the peripheral wall portion 20B to the concave portion 20Bc at both left and right sides of the concave portion 20Bc, it is possible to improve the discharge performance of the water pooled in the lamp chamber 12 to the outer space of the exterior panel 2.

In the above embodiment, descriptions have been made on the case where the grounding terminal that electrically connects the holding cable 70 to the fuselage side structural member 4 of the aircraft is constituted by the bolt 26. However, it is also possible to use other grounding terminals (e.g., a flat plate-shaped terminal or the like).

In the above embodiment, descriptions have been made on the case where the light source of the lamp unit 10 is constituted by the two light emitting elements 40. However, it is possible to use a light source constituted by other numbers of light emitting elements 40, and it is possible to use a configuration that includes a light source (e.g., a light source bulb or the like) other than the light emitting element 40.

In the above embodiment, descriptions have been made on the case where the lamp unit 10 is the outer emergency light of the aircraft. However, the lamp unit 10 may be used for other applications as long as the lamp unit is attached to the exterior panel 2 of the aircraft.

Numeric values shown as specifications in the above embodiments are merely illustrative, and different values may be, of course, set as appropriate.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A lamp unit comprising:
a housing made of metal and configured to be attached to an exterior panel of an aircraft;
a cover attached to the housing to form a lamp chamber; and
a light source accommodated in the lamp chamber,
wherein the cover includes a cover body having a light transmissive region that transmits light emitted from the light source and a metallic body support that supports an outer peripheral portion of the cover body, and the cover is fixed to the housing at the body support of the cover,
a holding cable that electrically and mechanically connects the housing to the body support of the cover at both ends of the holding cable, respectively is arranged in the lamp chamber at a position which does not block the light from the light source toward the light transmissive region of the cover body, and
a grounding terminal is provided in the housing to electrically connect the holding cable to a fuselage side structural member of the aircraft.

2. The lamp unit according to claim 1, wherein the holding cable is formed such that both ends of the holding cable are arranged at positions opposing to each other with respect to the light source.

3. The lamp unit according to claim 1, wherein the light source is constituted by at least one light emitting element mounted on a substrate,
a protruding portion is formed on a bottom wall of the housing to protrude toward an inside of the lamp chamber,
the substrate is detachably attached to the protruding portion, and
the holding cable is arranged to pass between a peripheral wall of the housing and the protruding portion.

4. The lamp unit according to claim 2, wherein the light source is constituted by at least one light emitting element mounted on a substrate,
a protruding portion is formed on a bottom wall of the housing to protrude toward an inside of the lamp chamber,
the substrate is detachably attached to the protruding portion, and
the holding cable is arranged to pass between a peripheral wall of the housing and the protruding portion.

5. The lamp unit according to claim 1, wherein the housing is configured such that an outer peripheral flange portion is formed on an outer peripheral side of a portion that fixes the body support of the cover in the housing, and the lamp unit is configured to be attached to the exterior panel from an inside of the aircraft at the outer peripheral flange portion.

6. The lamp unit according to claim 2, wherein the housing is configured such that an outer peripheral flange portion is formed on an outer peripheral side of a portion that fixes the body support of the cover in the housing, and
the lamp is configured to be attached to the exterior panel from an inside of the aircraft at the outer peripheral flange portion.

7. The lamp unit according to claim 3, wherein the housing is configured such that an outer peripheral flange portion thereof is formed on an outer peripheral side of a portion that fixes the body support of the cover in the housing, and
the lamp unit is configured to be attached to the exterior panel from an inside of the aircraft at the outer peripheral flange portion.

8. The lamp unit according to claim 4, wherein the housing is configured such that an outer peripheral flange portion is formed on an outer peripheral side of a portion that fixes the body support of the cover in the housing, and
the lamp unit is configured to be attached to the exterior panel from an inside of the aircraft at the outer peripheral flange portion.

9. The lamp unit according to claim 1, wherein the lamp unit is configured to be attached to the exterior panel at a side portion of the aircraft,
a notch is formed at a lower end portion of the body support of the cover to discharge water pooled in the lamp chamber to an outer space of the exterior panel, and
the holding cable is arranged to pass above the light source.

10. The lamp unit according to claim 1, wherein an end of the holding cable is connected to a bottom wall portion of the housing and the other end of the holding cable is connected to the body support of the cover via a metal fitting.

11. The lamp unit according to claim 9, wherein a concave portion is formed at a lower end portion of an inner peripheral surface of a peripheral wall of the housing to lead the water pooled in the lamp chamber to the notch of the body support of the cover.

12. The lamp unit according to claim 11, wherein a drainage groove that leads the water pooled in the lamp chamber to the concave portion is formed at both left and right sides of the concave portion to extend along the inner peripheral surface of the peripheral wall of the housing.

* * * * *